US011236220B2

(12) United States Patent
Cree et al.

(10) Patent No.: US 11,236,220 B2
(45) Date of Patent: Feb. 1, 2022

(54) POLYETHYLENE BLEND COMPOSITION

(71) Applicant: Dow Global Technologies LLC, Midland, MI (US)

(72) Inventors: Stephen H. Cree, Hirzel (CH); Mikhail Bogdanov, Moscow (RU)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 0 days.

(21) Appl. No.: 16/607,562

(22) PCT Filed: Apr. 20, 2018

(86) PCT No.: PCT/US2018/028470
§ 371 (c)(1),
(2) Date: Oct. 23, 2019

(87) PCT Pub. No.: WO2018/200319
PCT Pub. Date: Nov. 1, 2018

(65) Prior Publication Data
US 2020/0148865 A1 May 14, 2020

Related U.S. Application Data

(60) Provisional application No. 62/490,653, filed on Apr. 27, 2017.

(51) Int. Cl.
| C08K 5/00 | (2006.01) |
| C08K 5/14 | (2006.01) |
| C08L 23/06 | (2006.01) |
| H01B 3/44 | (2006.01) |

(52) U.S. Cl.
CPC .............. *C08L 23/06* (2013.01); *C08K 5/005* (2013.01); *C08K 5/14* (2013.01); *H01B 3/441* (2013.01); *C08L 2203/202* (2013.01); *C08L 2205/025* (2013.01); *C08L 2207/066* (2013.01); *C08L 2312/00* (2013.01)

(58) Field of Classification Search
CPC ........ C08K 13/02; C08K 11/00; C08K 5/005; C08K 5/0008; C08K 5/0025; C08K 5/14; C08L 23/04; C08L 23/06; C08L 23/08; C08L 2207/066; C08L 2203/20; C08L 2203/202; C08L 2312/00; C08L 2205/00; C08L 2205/025
See application file for complete search history.

(56) References Cited

U.S. PATENT DOCUMENTS

| 4,018,852 A | 4/1977 | Schober |
| 4,737,547 A * | 4/1988 | White ................ C08L 23/04 |
| | | 525/184 |
| 5,187,009 A | 2/1993 | Kimura et al. |
| 5,252,676 A | 10/1993 | Suyama et al. |
| 5,298,564 A | 3/1994 | Suyama et al. |
| 5,719,218 A | 2/1998 | Sarma |
| 5,834,544 A | 11/1998 | Lin et al. |
| 6,103,374 A | 8/2000 | Keogh |
| 6,180,706 B1 | 1/2001 | Keogh |
| 6,228,917 B1 | 5/2001 | Keogh |
| 6,231,978 B1 | 5/2001 | Keogh |
| 6,277,925 B1 | 8/2001 | Biswas et al. |
| 6,656,986 B2 | 12/2003 | Caronia et al. |
| 7,452,933 B2 | 11/2008 | Song et al. |
| 7,803,860 B2 | 9/2010 | Smedberg et al. |
| 8,283,391 B2 | 10/2012 | Easter |
| 8,912,284 B2 | 12/2014 | Bostrom et al. |
| 2007/0145625 A1 | 6/2007 | Caronia et al. |
| 2008/0254289 A1 | 10/2008 | Bostrom et al. |
| 2009/0247678 A1 | 10/2009 | Lee et al. |
| 2009/0264567 A1 | 10/2009 | Prins et al. |
| 2011/0196105 A1 | 8/2011 | Eddy et al. |
| 2015/0111053 A1 | 4/2015 | Nummila-Pakarinen et al. |
| 2016/0271882 A1 | 7/2016 | Bostrom et al. |
| 2018/0155525 A1 | 6/2018 | Smedberg et al. |

FOREIGN PATENT DOCUMENTS

| EP | 0453204 | 10/1991 |
| EP | 0475561 | 3/1992 |
| EP | 0522729 | 1/1993 |
| EP | 0965998 | 12/1999 |
| EP | 0965999 | 12/1999 |
| EP | 0966000 | 12/1999 |
| EP | 1041583 | 10/2000 |
| EP | 1695996 | 8/2006 |
| WO | 1999020686 | 4/1999 |
| WO | 1999021194 | 4/1999 |
| WO | 1999033069 | 7/1999 |
| WO | 0055226 | 9/2000 |
| WO | 2002020654 | 3/2002 |
| WO | 2005066280 | 7/2005 |
| WO | 2006049783 | 5/2006 |
| WO | 2006089744 | 8/2006 |
| WO | 2006114283 | 11/2006 |
| WO | 2006131264 | 12/2006 |
| WO | 2006131265 | 12/2006 |
| WO | 2007123331 | 11/2007 |
| WO | 2009007118 | 1/2009 |
| WO | 2009021050 | 2/2009 |
| WO | 2009114661 | 9/2009 |
| WO | 2015149632 | 10/2015 |
| WO | WO-2016055959 A1 * | 4/2016 |
| WO | WO-2016066619 A1 * | 5/2016 |

OTHER PUBLICATIONS https://www.usplastic.com/knowledgebase/article.aspx?contentkey=508 downloaded Sep. 22, 2020 (Year: 2020).*

*Primary Examiner* — Irina S Zemel
*Assistant Examiner* — Jeffrey S Lenihan

(57) ABSTRACT

A crosslinkable low density polyethylene blend composition, cured product made therefrom, methods of making and using same, and articles containing same.

7 Claims, No Drawings

US 11,236,220 B2

POLYETHYLENE BLEND COMPOSITION

FIELD

The field includes crosslinkable polyethylene blend compositions, cured products made therefrom, methods of making and using same, and articles containing same.

INTRODUCTION

Insulated electrical conductors include coated metal wires and electrical cables, including power cables for use in low voltage ("LV", >0 to <5 kilovolts (kV)), medium voltage ("MV", 5 to <46 kV), high voltage ("HV", 46 to 230 kV, e.g., from 46 to 150 kV) and extra-high voltage ("EHV", >220 kV) data transmitting and electricity-transmitting/distributing applications.

A power cable's operating temperature may be greater than ambient temperature. Therefore, the wire and cable industry typically desires an insulation layer be made from a networked polymer that has low elongation under stress at elevated temperature ("hot creep") in field use.

The networked polymer is made by curing a crosslinkable polymer after the crosslinkable polymer has been extruded as an uncured insulation layer directly onto a wire, or onto an inner semiconducting layer that is covering the wire. The crosslinkable polymer must have a high enough melt flow rate that enables extruding it. But the higher the melt flow rate of the crosslinkable polymer the higher the networked polymer's hot creep during field use. Various types of crosslinkable polymers/networked polymers that balance these competing property requirements are known to the industry. These include crosslinkable polyolefins and their crosslinked polyolefin products (networked polymers). In the case of crosslinkable polyethylenes the melt flow rate (melt index) that the industry desires is 2 grams per 10 minutes measured at 190° C., 2.16 kilograms (kg), ASTM D1238-04, "melt index ($I_2$)".

EP 1 695 996 A1 to J-O Boström, et al. ("BOSTRÖM") relates to a scorch-retarding polymer composition. Particularly a crosslinkable polymer composition, comprising an unsaturated polyolefin having a total amount of carbon-carbon double bonds/1000 carbon atoms of at least 0.1, at least one scorch retarder, and at least one crosslinking agent. In Table 2 of BOSTRÖM, a reference formulation includes a polymer, an anti-oxidant, and a cross-linking agent, but did not include a scorch retarder. The polymer is a low density polyethylene (LDPE) characterized by $MFR_2=2.0$ g/10 min and a carbon-carbon double bond content (Table 1).

WO 2005/066280 A2 to P. J. Caronia et al. ("CARONIA") relates to free-radical crosslinkable polymers: improved process for crosslinking and compositions. The improved process delivers hotter processing conditions, faster crosslinking, or increased crosslinked densities. The crosslinkable polymeric composition comprises (1) a free-radical crosslinkable polymer, (2) a free-radical inducing species, and (3) a crosslinking-temperature-profile modifier. In Table IV of CARONIA, formulations include either a LDPE having a Melt Index 12 of 2.1 g/10 min. (Mirathen CY 7423 LDPE, Table 111) or a LDPE having a Melt Index 12 of 2.4 g/10 min. (DXM-446 LDPE, Table 111). Certain formulations in Table IV further include Irganox 1081 FF, or 4-hydroxy-TEMPO, or Bis-TEMPO, or a combination of 4-hydroxy-TEMPO and Sartomer SR-350 coagent. In Table XVII Example 43 includes an EPDM (Nordel 3722P), a LDPE having a Melt Index 12 of 2 g/10 min. and a density of 0.923 g/cm3; zinc oxide; treated, calcined clay; paraffin wax; antioxidant; peroxide; color masterbatch; and 4-hydroxy-TEMPO.

SUMMARY

We recognized a problem that hurts the manufacturing of insulated electrical conductors such as power cables. Our problem occurred when extruding a crosslinkable polymeric composition comprising an organic peroxide and a crosslinkable polyolefin, particularly a crosslinkable polyethylene, more particularly a crosslinkable low density polyethylene (LDPE), still more particularly a crosslinkable LDPE characterized by an industry-balanced melt index (190° C., 2.16 kilograms (kg), ASTM D1238-04, "melt index ($I_2$)") of 2 grams per 10 minutes (g/10 min.) ($LDPE_{MI2}$) If we increased the production rate too much, by increasing the rotations per minute (rpm) of an extruder, the resulting insulation layer became lumpy or uneven to the touch and by unaided human eye inspection. This limited the production rate, or harmed the quality, of the insulation layer composed of the industry-balanced melt index ($I_2$) crosslinkable $LDPE_{MI2}$ and the organic peroxide. The problem then was to provide a new crosslinkable polymeric composition based on LDPE that enabled an increased production rate, e.g., increased rpm at a given temperature, with no lumpiness and with at least one of the following improvements: satisfactory or enhanced (increased) scorch time, and/or satisfactory or enhanced cure performance such as satisfactory or enhanced (decreased) hot creep, also known as hot set.

A technical solution to this problem was not obvious. Extruding an industry-balanced melt index ($I_2$) LDPE composition at a slightly higher extrusion temperature avoided lumpiness but lead to decomposition of the organic peroxide, which lead to scorch or premature crosslinking of the crosslinkable $LDPE_{MI2}$. Blending a second LDPE having an $I_2$ of 5 to 25 g/10 min. ($LDPE_{MI5-MI25}$) into the industry-balanced melt index ($I_2$) LDPE composition gave a preliminary composition of a blend of the crosslinkable $LDPE_{MI2}$ and the $LDPE_{MI5-MI25}$, and the organic peroxide. The preliminary composition unexpectedly eliminated the lumpiness and enabled an increase in insulation layer output from an extruder operating at a given rotation per minute (rpm). Unfortunately the rate or extent of curing of the preliminary composition was significantly slower or lesser, respectively, than the rate or extent of curing the industry-balanced melt index ($I_2$) LDPE composition. This meant that at a given operating temperature the insulation layer composed of the preliminary composition had to be cured for longer periods of time. Increasing the concentration of the organic peroxide in the preliminary composition partially recovered some of the lost cure rate. But high concentrations of organic peroxide decreased the time to scorch and caused peroxide sweat out.

Our technical solution to this problem includes a new peroxide-curable polyethylene blend composition (inventive composition) comprising a blend of crosslinkable LDPEs, an effective amount of an organic peroxide, and an effective amount of a propenyl-functional coagent. The blend of crosslinkable LDPEs comprises a blend of melt indexes ($I_2$). Also included is a new crosslinked polyethylene polymer (inventive crosslinked product) made by curing the inventive composition. Also included are methods of making and using the inventive composition and articles comprising or made from the inventive composition or crosslinked product. The inventive composition and crosslinked product are suitable for use as, but not limited to, a single layer covering or a multilayer covering in the insulated electrical conductor, e.g., a crosslinked polyolefin insulation layer of a multilayer covering of an insulated electrical conductor. Also included is the crosslinked polyolefin insulation layer made from the inventive composition or crosslinked product, the single or multilayer covering (e.g., the multilayer covering containing the crosslinked polyolefin insulation layer), and the insulated electrical conductor containing the single or multilayer covering. The insulated electrical conductor is useful for data- and/or electricity-transmitting/distributing applications, including low, medium, high, and ultra-high voltage applications.

DETAILED DESCRIPTION

The Summary and Abstract are incorporated here by reference. The higher melt flow LDPE and the aforementioned effective amounts of the constituents enable the inventive composition and crosslinked product are characterized by at least one, alternatively at least two, alternatively each of properties (i) to (iii): (i) enhanced (decreased) hot creep (also known as hot set); (ii) enhanced cure performance (increased cure rate or increased extent of cure); and (iii) enhanced (increased) time to scorch (ts1). The inventive composition and crosslinked product enable increased production rate with no lumpiness, satisfactory scorch performance, and satisfactory cure rate. The inventive composition may be free of peroxide sweat out.

Aspect 1. A peroxide-curable polyethylene blend composition comprising a blend of constituents (A) and (B) that contains constituents (C) and (D): (A) a crosslinkable low density polyethylene characterized by a melt index (190° C., 2.16 kilograms (kg), ASTM D1238-04, "melt index ($I_2$)") of 1.50 to 2.49 grams per 10 minutes (g/10 min.) ("crosslinkable LDPE (A)" or "constituent (A)" or "(A)"); (B) a crosslinkable low density polyethylene characterized by an enhanced melt index ($I_2$) of 5.0 to 25 g/10 min. ("crosslinkable LDPE (B)" or "constituent (B)" or "(B)"); (C) an organic peroxide; and (D) a propenyl-functional coagent; wherein concentrations thereof are: (A) is 94.9 to 55.0 weight percent (wt %), (B) is 5.0 to 40.0 wt %, (C) is 0.1 to 3.0 wt %, and (D) is 0.10 to 1.0 wt %, all based on total weight of the peroxide-curable polyethylene blend composition.

Aspect 2. The peroxide-curable polyethylene blend composition of aspect 1 further described by any one of limitations (i) to (iii): (i) the blend of (A) and (B) is characterized by a melt index ($I_2$) of 2.5 to 4.5 g/10 min., alternatively 2.5 to 3.4 g/10 min., alternatively 2.6 to 2.9 g/10 min. and/or a concentration from 85 to 98 wt %, alternatively from 91 to 98.0 wt %, alternatively from 95.0 to 97.5 wt %, based on total weight of the composition; (ii) constituent (A) is characterized by a melt index ($I_2$) of 1.6 to 2.4 g/10 min., alternatively 1.7 to 2.3 g/10 min., alternatively 1.8 to 2.2 g/10 min., alternatively 2.0±0.1 g/10 min. and/or a concentration from 89 to 61 wt %, alternatively from 83 to 63.0 wt %, based on total weight of the composition; (iii) constituent (B) is characterized by a melt index ($I_2$) from 7 to 23 g/10 min., alternatively 8 to 21 g/10 min., alternatively 7 to 20 g/10 min., alternatively 7 to 10 g/10 min., alternatively 18 to 22 g/10 min. and/or a concentration from 10.1 to 35 wt %, alternatively from 14 to 20 wt %, alternatively 33 to 35 wt %, based on total weight of the composition.

Aspect 3. The peroxide-curable polyethylene blend composition of aspect 1 or 2 further described by any one of limitations (i) to (v): (i) the (C) organic peroxide is from 0.5 to 2.0 wt %, alternatively from 0.6 to 1.9 wt %, all wt % based on total weight of the peroxide-curable polyethylene blend composition; (ii) the (C) organic peroxide is a compound of formula $R^O$—O—O—$R^O$, wherein each $R^O$ independently is a ($C_1$-$C_{20}$)alkyl group or ($C_6$-$C_{20}$)aryl group; (iii) the (C) organic peroxide is bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl)benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide; (iv) the (C) organic peroxide is dicumyl peroxide; and (v) a combination of (i) and any one of (ii) to (iv).

Aspect 4. The peroxide-curable polyethylene blend composition of any one of aspects 1 to 3 further described by any one of limitations (i) to (iv): (i) (D) is 2-allylphenol; 2-allylphenyl allyl ether; 4-isopropenyl-2,6-dimethylphenyl allyl ether; 2,6-dimethyl-4-allylphenol; 2,6-dimethylphenyl allyl ether; 2,6-dimethyl-4-allylphenyl allyl ether; 2-methoxy-4-allylphenol; 2-methoxy-4-allylphenyl allyl ether; 2,2'-diallyl bisphenol A; O,O'-diallyl bisphenol A; or tetramethyl diallylbisphenol A; (ii) (D) is 2,4-diphenyl-4-methyl-1-pentene or 1,3-diisopropenylbenzene; (iii) (D) is triallyl isocyanurate ("TAIC"); triallyl cyanurate ("TAC"); triallyl trimellitate ("TATM"); N,N,N',N',N'',N''-hexaallyl-1,3,5-triazine-2,4,6-triamine ("HATATA"; also known as $N^2,N^2,N^4,N^4,N^6,N^6$-hexaallyl-1,3,5-triazine-2,4,6-triamine); triallyl orthoformate; pentaerythritol triallyl ether; triallyl citrate; or triallyl aconitate; (iv) (D) is a mixture of any two of the propenyl-functional coagents in (i).

Aspect 5. The peroxide-curable polyethylene blend composition of any one of aspects 1 to 4 further described by any one of limitations (i) to (v): (i) constituent (C) is dicumyl peroxide; (ii) constituent (D) is 2,4-diphenyl-4-methyl-1-pentene or 1,3-diisopropenylbenzene; (iii) the composition further comprises constituent (E) antioxidant; (iv) the composition further comprises constituent (E) antioxidant and (E) is bis(4-(1-methyl-1-phenylethyl)phenyl)amine; 2,2'-methylene-bis(4-methyl-6-t-butylphenol); 2,2'-thiobis(2-t-butyl-5-methylphenol; 2,2'-thiobis(6-t-butyl-4-methylphenol; tris[(4-tert-butyl-3-hydroxy-2,6-dimethylphenyl)methyl]-1,3,5-triazine-2,4,6-trione; pentaerythritol tetrakis (3-(3,5-bis(1,1-dimethylethyl)-4-hydroxyphenyl) propionate; 3,5-bis(1,1-dimethylethyl)-4-hydroxybenzenepropanoic acid 2,2'-thiodiethanediyl ester; or distearyl thiodipropionate; and (v) a combination of (i), (ii) and any one antioxidant of (iv).

Aspect 6. A method of making a peroxide-curable polyethylene blend composition of any one of aspects 1 to 5, the method comprising contacting effective amounts of constituents (A) to (D), and any optional constituent (E), to give the peroxide-curable polyethylene blend composition. In some aspects the method is conducted according to Preparation Method 1 described later.

Aspect 7. A crosslinked polyethylene product that is a product of curing the peroxide-curable polyethylene blend composition any one of aspects 1 to 5. The curing may be performed by heating the peroxide-curable polyethylene blend composition at a temperature from 50° to 220° C., alternatively 50° to 170° C., alternatively 100° to 220° C., for a period of time from 24 hours to 3 minutes, alternatively 24 hours to 30 minutes, alternatively 12 hours to 3 minutes. The resulting crosslinked polyethylene product may be used prior to cooling or may be cooled, e.g., to ambient temperature.

Aspect 8. A manufactured article comprising a shaped form of the crosslinked polyethylene product of aspect 7.

Aspect 9. A coated conductor comprising a conductive core and an insulation layer at least partially, alternatively 95% to <100%, alternatively completely (100%) covering the conductive core, wherein at least a portion of the insulation layer comprises the crosslinked polyethylene product of aspect 8. The insulation layer may be a single layer covering or multilayer covering the conductive core. The coated conductor may be an insulated electrical conductor as generally described in the Introduction, which description is hereby incorporated by reference, except wherein the crosslinked polyolefin insulation layer of the multilayer covering of the insulated electrical conductor is comprised of the inventive crosslinked product. The inventive insulated electrical conductor may be an insulated electrical conductor and useful for transmitting data or electricity.

Aspect 10. A method of conducting electricity, the method comprising applying a voltage across the conductive core of the coated conductor of aspect 9 so as to generate a flow of electricity through the conductive core.

All properties described herein are measured according to their respective standard test methods described later unless explicitly indicated otherwise. Density is measured according to ASTM D792-13, Melt index ($I_2$) is measured according to ASTM D1238-04 (190° C., 2.16 kg), and the like.

As used herein, low density polyethylene or LDPE means one or more macromolecules of a branched ethylene homopolymer, wherein the macromolecule(s) consist essentially of, alternatively consist of ethylene monomeric units. LDPE is distinct from linear low density polyethylene (LLDPE) and the like in structure and other properties (e.g., density). LDPE is also distinct from ethylene copolymers such as ethylene/propylene copolymers, ethylene/propylene/diene (EPDM) copolymers, and ethylene/($C_4$-$C_{40}$)alpha-olefin copolymers in structure and other properties.

The peroxide-curable polyethylene blend composition (inventive composition, e.g., of aspects 1 to 5). The total weight of all constituents is 100 wt %. The inventive composition may be substantially free of, alternatively may not contain, a polyolefin other than constituents (A) and (B). E.g., is substantially free from or, alternatively does not contain, an ethylene/unsaturated carboxylic ester copolymer, a poly($C_4$-$C_{40}$)alpha-olefin homopolymer, an ethylene/($C_3$-$C_{40}$)alpha-olefin copolymer, or a polystyrene. In this context, consisting essentially of means that the inventive composition contains 0 to 1 wt %, alternatively 0 to <0.1 wt %, alternatively 0 wt % of any other polymer, not counting constituents (A) to (B).

The peroxide-curable polyethylene blend composition contains the constituents (A) to (D), described in more detail later. The composition may be made in any suitable method provided that (A) and (B) are blended together. The (A) and (B) are LDPEs as described earlier each independently characterized by a molecular weight distribution (MWD) or $Đ_M = M_w/M_n$. The (A), (B), and (D) may be blended together before being contacted with (C). Typically, the (A) and (B) may be blended together to give a crosslinkable LDPE blend consisting essentially of, alternatively consisting of (A) and (B). That is, the blend of (A) and (B) may be made, and then later the blend of (A) and (B) may be contacted with (C) and/or (D), or any optional constituent. Alternatively, one or more or all of constituent (C) and/or (D), plus any optional constituent(s) or additive(s), may be blended with one of constituents (A) and (B) to give either a first preliminary blend of (A) with constituent (C) and/or (D) plus any optional constituent(s) or additive(s) or a second preliminary blend of (B) with constituent (C) and/or (D) plus any optional constituent(s) or additive(s). Then the constituent (B) may be blended with the first preliminary blend or the constituent (A) may be blended with the second preliminary blend, thereby giving the peroxide-curable polyethylene blend composition.

The blend of (A) and (B) may be characterized by its melt index ($I_2$) as described earlier. The blend of (A) and (B) is distinct from, and differs compositionally and in at least one property from, a reference LDPE having been made by a reference method other than the present blending.

The (A) and (B) independently may consist of carbon and hydrogen atoms. The (A) and (B) independently may be substantially free or free of other heteroatoms (e.g., halogen, N, S, P). Under curing conditions (typically comprising heating to a temperature above 160° C., alternatively above 180° C.) the (C) organic peroxide forms oxygen-radicals. The O-radicals abstract hydrogen atoms from interior carbon atoms in backbones or side chains of the crosslinkable LDPEs of (A) and (B), thereby generating internal polymeric chain free radicals on carbon atoms. The carbon radicals couple to form the crosslinked product. The crosslinking occurs via a curing reaction under curing conditions, thereby forming the crosslinked polyethylene product, which comprises a networked polymer. The (D) may also react and form crosslinks in the crosslinked polyethylene product.

The peroxide-curable polyethylene blend composition may be a one-part formulation, alternatively a two-part formulation, alternatively a three-part formulation. The one-part formulation comprises constituents (A) to (D), and any optional constituents such as constituent (E), in a single mixture, which is the peroxide-curable polyethylene blend composition. The two-part formulation may comprise first and second parts, wherein the first part consists essentially of a blend of (A) and (B) and, optionally, (D) propenyl-functional coagent, and wherein the second part consists essentially of an additive masterbatch composition containing at least one of constituents (A) to (B), and any optional constituents such as additive (E). The remaining constituents (B) to (D), and any optional constituents such as additive (E), may be in the first part or the second part or both. The peroxide-curable polyethylene blend composition may be made from the two-part formulation by combining the first and second parts to give an admixture thereof as the peroxide-curable polyethylene blend composition. The three-part formulation may be the same as the two-part formulation except that constituent (C) is not in the first or second parts, but constituent (C) organic peroxide comprises a third part. When (C) comprises a third part, the peroxide-curable polyethylene blend composition may be made by combining the first and second parts to give an admixture thereof containing constituents (A), (B), (D), and optionally any constituent (E); if desired optionally pelletizing the admixture to give the admixture in the form of pellets; and then contacting the admixture (e.g., pellets) of the first and second parts with the third part (i.e., (C) organic peroxide to give the peroxide-curable polyethylene blend composition. Generally, the combining or mixing (contacting) of constituents (A), (B), and (D), and any optional constituents such as additive (E), may be carried out at a temperature from about 20° to 100° C. for 2 to 100 hours, e.g., 60° to 80° C. for 6 to 24 hours. Higher temperatures may be used when combining constituents (A), (B), (D), and any constituent (E), to give an admixture in the absence of (C) organic peroxide, and thereafter the admixture may be cooled to a temperature below a curing temperature before being combined or contacted with (C) organic peroxide. There is no inherent reason why any combination of constituents (A) to (D), and any optional constituent (E), cannot be included in either the one-part formulation or the first part or the second part of the two-part formulation. There generally aren't any incompatibilities amongst (A) to (E).

Constituent (A): a crosslinkable low density polyethylene characterized by a melt index (190° C., 2.16 kilograms (kg), ASTM D1238-04) of 1.50 to 2.49 g/10 min. The crosslinkable LDPE (A) is described above. In some aspects (A) is further characterized by a density of 0.910 to 0.940 g/cm$^3$. An example of (A) is DFDK-7423 NT, a crosslinkable LDPE having a melt index ($I_2$) of 2.0 g/10 min. and a density of 0.920 g/cm$^3$ and is available from The Dow Chemical Company, Midland, Mich., USA. Another example of (A) is DXM-446 LDPE having a melt index ($I_2$) of 2.4 g/10 min. and a density of 0.920 g/cm$^3$, available from The Dow Chemical Company; and LDPE DXM-447 having a melt index ($I_2$) of 1.9 g/10 min. and a density of 0.9183 g/cm$^3$, available from The Dow Chemical Company.

Constituent (B): a crosslinkable low density polyethylene characterized by an enhanced melt index ($I_2$) of 5.0 to 25 g/10 min. The crosslinkable LDPE (B) is described above. In some aspects (B) is further characterized by a density of 0.910 to 0.940 g/cm$^3$. An example of (B) is any one of LDPE 7009E, LDPE 7010E, LDPE 740E, LDPE 750E, or LDPE 780E, all available from The Dow Chemical Company. LDPE 7009E is characterized by a melt index ($I_2$) of 8.7 g/10 min. and a density of 0.919 g/cm$^3$. LDPE 7010E is characterized by a melt index ($I_2$) of 8.5 g/10 min. and a density of 0.919 g/cm$^3$. LDPE 740E is characterized by a melt index ($I_2$) of 7.5 g/10 min. and a density of 0.920 g/cm$^3$. LDPE 750E is characterized by a melt index ($I_2$) of 15 g/10 min. and a density of 0.920 g/cm$^3$. LDPE 780E is characterized by a melt index ($I_2$) of 20 g/10 min. (19.50 to 20.49 g/10 min.) and a density of 0.923 g/cm$^3$. The melt index ($I_2$) values reported for LDPE 750E and 780E are measured according to ISO 1133:2011 (Plastics—Determination of the melt mass-flow rate (MFR) and melt volume-flow rate (MVR) of thermoplastics).

Polymerization methods suitable for making crosslinkable low density polyethylenes (LDPEs) such as (A) and (B) are generally well-known. The LDPEs may be made using a high pressure process that is free of or does not include an olefin polymerization catalyst. E.g., does not contain a Ziegler-Natta catalyst, metallocene catalyst, or post-metallocene catalyst. Examples of suitable processes for making LDPEs useful herein are described in WO 2006/049783 A1, WO 2009/114661 A1, US 2011/0196105 A1 and US 2015/0111053 A1. In an embodiment the process is that described in US 2011/0196105 A1, paragraphs [0019] and [0024] to [0031]. In another embodiment the process is that described in US 2015/0111053 A1, paragraphs [0009] to [0013], alternatively paragraphs [0090] to [0104], alternatively paragraph [0174], [0179], [0184], [0189], or [0194], each independently in view of paragraphs [0171] to [0173].

The constituent (C): organic peroxide. The (C) organic peroxide may be 0.05 to 4.5 wt %, alternatively 0.1 to 3 wt %, alternatively 0.5 to 2.5 wt % of the peroxide-curable polyethylene blend composition. The (C) organic peroxide may be of formula $R^O$—O—O—$R^O$, wherein each $R^O$ independently is a ($C_1$-$C_{20}$)alkyl group or ($C_6$-$C_{20}$)aryl group. Each ($C_1$-$C_{20}$)alkyl group independently is unsubstituted or substituted with 1 or 2 ($C_6$-$C_{12}$)aryl groups. Each ($C_6$-$C_{20}$)aryl group is unsubstituted or substituted with 1 to 4 ($C_1$-$C_{10}$)alkyl groups. The (C) organic peroxide may be any one of the organic peroxides described earlier, or a combination of any two or more thereof. In some aspects only a single type of (C) organic peroxide is used, e.g., a 20:80 (wt/wt) blend of t-butyl cumyl peroxide and bis(t-butyl peroxy isopropyl)benzene (e.g., LUPEROX D446B, which is commercially available from Arkema), alternatively dicumyl peroxide (e.g., PERKADOX BC—FF from AkzoNobel).

The constituent (D) propenyl-functional coagent. (D) is at least one propenyl-functional coagent. Also called a propenyl-functional crosslinker. The propenyl-functional coagent may have 1 or more, typically at most 6, propenyl groups on average per molecule. Each propenyl group is independently either a monovalent hydrocarbon functional group formally derived by abstracting any one hydrogen atom from propene ($H_2C$=$C(H)CH_3$) or a divalent hydrocarbon functional group (a "propen-diyl") formally derived by abstracting any two hydrogen atoms from propene. In some aspects each propenyl group is the monovalent. In other aspects at least one propenyl group is the divalent. In some aspects the propenyl-functional coagent is a ($H_2C$=$C(H)(CH_2)_b$-functional) coagent. Also called ($H_2C$=$C(H)(CH_2)_b$-functional) crosslinker. Subscript b is an integer of 0, 1, or 2; alternatively 0 or 1; alternatively 1 or 2; alternatively 0 or 3; alternatively 0; alternatively 1; alternatively 2. Examples of the ($H_2C$=$C(H)(CH_2)_b$-functional groups are vinyl groups (b is 0), allyl groups (b is 1) and butenyl groups (b is 2). The (D) may have a molecule of molecular weight from 110 to 600 grams/mole (g/mol), alternatively 200 to 550 g/mol. In some aspects (D) is a hydrocarbon consisting of carbon and hydrogen atoms. In other aspects (D) is a heterohydrocarbon consisting of carbon and hydrogen atoms and 1 or more oxygen atoms and/or one or more nitrogen atoms. Examples of (D) having 1 ($H_2C$=$C(H)(CH_2)_b$-functional group include the allyl compounds described in U.S. Pat. No. 6,277,925 B1, at column 2, line 61, to column 3, line 46, and at column 9, line 51 to column 10, line 29. Examples of the allyl compounds described in U.S. Pat. No. 6,277,925 B1 include 2-allylphenol; 2-allylphenyl allyl ether; 4-isopropenyl-2,6-dimethylphenyl allyl ether; 2,6-dimethyl-4-allylphenol; 2,6-dimethylphenyl allyl ether; 2,6-dimethyl-4-allylphenyl allyl ether; 2-methoxy-4-allylphenol; 2-methoxy-4-allylphenyl allyl ether; 2,2'-diallyl bisphenol A; O,O'-diallyl bisphenol A; and tetramethyl diallylbisphenol A; as well as mixtures of coagents described at column 10, lines 37-45. Other examples of (D) include 2,4-diphenyl-4-methyl-1-pentene, also known as alpha-methylstyrene dimer or "AMSD" (CAS No. 6362-80-7); and 1,3-diisopropenylbenzene ("DIPB", CAS No. 3748-13-8). The (D) may be a multi($H_2C$=$C(H)(CH_2)_b$-functional) coagent having 2, 3, or 4 ($H_2C$=$C(H)(CH_2)_b$— groups. Examples of the multi ($H_2C$=$C(H)(CH_2)_b$-functional) coagent include triallyl isocyanurate ("TAIC"); triallyl cyanurate ("TAC"); triallyl trimellitate ("TATM"; CAS No. 2694-54-4); N,N,N',N',N'',N''-hexaallyl-1,3,5-triazine-2,4,6-triamine ("HATATA"; also known as $N^2,N^2,N^4,N^4,N^6,N^6$-hexaallyl-1,3,5-triazine-2,4,6-triamine); triallyl orthoformate; pentaerythritol triallyl ether; triallyl citrate; and triallyl aconitate; acrylate-based coagents; multi-vinyl-based coagents; and other coagents such as those described in U.S. Pat. Nos. 5,346,961 and 4,018,852. Examples of suitable acrylate-based coagents are trimethylolpropane triacrylate ("TMPTA"); trimethylolpropane trimethyl acrylate ("TMPTMA"); ethoxylated bisphenol A dimethacrylate; 1,6-hexanediol diacrylate; pentaerythritol tetraacrylate; dipentaerythritol pentaacrylate; tris(2-hydroxyethyl) isocyanurate triacrylate; and propoxylated glyceryl triacrylate. Examples of suitable multi-vinyl-based coagents are polybutadiene having a high 1,2-divinyl content; and trivinyl cyclohexane ("TVCH"). In some aspects (D) is AMSD, TAC, TAIC, HATATA, or TMPTA; alternatively AMSD, TAC, or TAIC; alternatively AMSD. The (D) functions to increase crosslink density in the resulting cured polyolefin product relative to crosslink density that can be obtained in the absence of the (D).

Optional constituents such as (E) are interchangeably referred to herein as additives.

The optional constituent (E) antioxidant. The (E) antioxidant functions to provide antioxidizing properties to the peroxide-curable polyethylene blend composition and/or peroxide-cured semiconducting product. Examples of suitable (E) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl) propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); and distearyl thiodipropionate ("DSTDP"). In some aspects (E) is bis(4-(1-methyl-1-phenylethyl)phenyl)amine (e.g., NAUGARD 445, which is commercially available from Addivant, Danbury, Conn., U.S.A.). (E) may be 0.01 to 1.5 wt %, alternatively 0.05 to 1.2 wt %, alternatively 0.1 to 1.0 wt % of the peroxide-curable polyethylene blend composition.

The peroxide-curable polyethylene blend composition may further comprise at least one of constituents (F) to (K): (F) a filler; (G) a polydimethylsiloxane (PDMS) fluid; (H) a hindered amine stabilizer; (I) a tree retardant; (J) a methyl radical scavenger; and (K) a scorch retardant.

Constituent (F) filler. The (F) filler may be a calcined clay, an organoclays, carbon black, titanium oxide, or a hydrophobized fumed silica such as those commercially available under the CAB-O-SIL trade name from Cabot Corporation. The (F) filler may have flame retarding effects.

The optional constituent (G) polydimethylsiloxane (PDMS) fluid. (G) may have a kinematic viscosity of 1,000 to 50,000 centiStokes (cSt). When present, (G) may be in a concentration of from 200 to 1,000 ppm (weight parts per million weight parts of the peroxide-curable polyethylene blend composition).

The optional constituent (H) hindered amine stabilizer. The (H) is a compound that has a sterically hindered amino functional group and inhibits oxidative degradation and can also reduce acid-catalyzed degradation, if any, of (C) organic peroxide. Examples of suitable (H) are butanedioic acid dimethyl ester, polymer with 4-hydroxy-2,2,6,6-tetramethyl-1-piperidine-ethanol (CAS No. 65447-77-0, commercially LOWILITE 62).

The optional constituent (I) water tree retardant or electrical tree retardant. The water tree retardant is a compound that inhibits water treeing, which is a process by which polyolefins degrade when exposed to the combined effects of an electric field and humidity or moisture. The electrical tree retardant is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. The (I) may be a poly(ethylene glycol) (PEG).

The optional constituent (J) methyl radical scavenger. The (J) react with methyl radicals in the composition or product. The (J) may be a "TEMPO" derivative of 2,2,6,6-tetramethyl-1-piperidinyl-N-oxyl. Examples include 4-acryloxy-2,2,6,6-tetramethyl-1-piperidinyl-N-oxyl (CAS No. 21270-85-9, "acrylate TEMPO"), 4-allyloxy-2,2,6,6-tetramethyl-1-piperidinyl-N-oxyl (CAS No. 217496-13-4, "allyl TEMPO"); bis(2,2,6,6-tetramethyl-1-piperidinyl-N-oxyl) sebacate (CAS No. 2516-92-9, "bis TEMPO")); N,N-bis (acryloyl-4-amino)-2,2,6,6-tetramethyl-1-piperidinyl-N-oxyl (CAS No. 1692896-32-4, "diacrylamide TEMPO"); and N-acryloyl-4-amino-2,2,6,6-tetramethyl-1-piperidinyl-N-oxyl (CAS No. 21270-88-2, "monoacrylamide TEMPO").

Constituent (K) scorch retardant. Examples of a scorch retardant are allyl-containing compounds described in U.S. 6277925B1, column 2, line 62, to column 3, line 46.

In addition the peroxide-curable polyethylene blend composition may further comprise 0.005 to 0.5 wt % each of one or more optional additives selected from a dielectric fluid, carrier resin, lubricant, processing aid, nucleating agent, slip agent, plasticizer, surfactant, extender oil, acid scavenger, voltage stabilizer, and metal deactivator.

To facilitate mixing of the blend of constituents (A) and (B) with the constituents (C), (D), and any optional constituents such as (E), one or more of the constituents (C) to (E) and optionally any others may be provided in the form of an additive masterbatch.

The crosslinked polyethylene product. The crosslinked polyethylene product contains networked polyethylenic resins that contain C—C bond crosslinks formed during curing of the peroxide-curable polyethylene blend composition. The networked polyethylenic resins comprise products of coupling the crosslinkable LDPEs (A) and (B) and optionally products of coupling same with (D) propenyl-functional coagent. The crosslinked polyethylene product may also contain by-products of curing such as alcohol products of the reaction of the (C) organic peroxide. When the peroxide-curable polyethylene blend composition further contains one or more of any optional constituents such as (E), the crosslinked polyethylene product may also contain the any one or more of the optional constituents such as (E), or one or more reaction products formed therefrom during the curing of the peroxide-curable polyethylene blend composition. The crosslinked polyethylene product may be in a divided solid form or in continuous form. The divided solid form may comprise granules, pellets, powder, or a combination of any two or more thereof. The continuous form may be a molded part (e.g., injection molded part) or an extruded part (e.g., a coated conductor or a cable).

The coated conductor. The coated conductor may be an insulated electrical conductor. The insulated electrical conductor may include coated metal wires and/or electrical cables, including power cables, for use in low, medium, high and extra-high voltage electricity-transmitting applications or data transmitting applications. A "wire" means a single strand or filament of conductive material, e.g., conductive metal such as copper or aluminum. A "cable" and "power cable" are synonymous and mean an insulated electrical conductor comprising at least one wire disposed within a covering that may be referred to as a sheath, jacket (protective outer jacket), or coating. The insulated electrical conductor may be designed and constructed for use in medium, high, or extra-high voltage applications. Examples of suitable cable designs are shown in U.S. Pat. Nos. 5,246,783; 6,496,629; and 6,714,707.

The insulated electrical conductor may contain a conductor/transmitter core and an outer single layer covering or an outer multilayer covering disposed therearound so as to protect and insulate the conductor/transmitter core from external environments. The conductor/transmitter core may be composed of one or more metal wires. When the conductor/transmitter core contains two or more metal wires, the metal wires may be sub-divided into discrete wire bundles. Each wire in the conductor/transmitter core, whether bundled or not, may be individually coated with an insulation layer and/or the discrete bundles may be coated with an insulation layer. The single layer covering or multilayer covering (e.g., a single layer or multilayer coating or sheath) primarily functions to protect or insulate the conductor/transmitter core from external environments such as sunlight, water, heat, oxygen, other conductive materials (e.g., to prevent short-circuiting), and/or other corrosive materials (e.g., chemical fumes).

The single layer or multilayer covering from one insulated electrical conductor to the next may be configured differently depending upon their respective intended uses. For example, viewed in cross-section, the multilayer covering of the insulated electrical conductor may be configured sequentially from its innermost layer to its outermost layer with the following components: an inner semiconducting layer, a crosslinked polyolefin insulation layer comprising the crosslinked polyethylene product (inventive crosslinked product), an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). Depending on the intended application the multilayer covering for the insulated optical fiber may omit the semiconducting layers and/or the metal shield. The outer semiconducting layer, when present, may be composed of a peroxide-crosslinked semiconducting product that is either bonded or strippable from the crosslinked polyolefin layer.

In some aspects there is a method of making the coated conductor, the method comprising extruding a coating comprising a layer of the peroxide-curable polyethylene blend composition onto a conductor/transmitter core to give a coated core, and passing coated core through a catenary continuous vulcanization (CCV) apparatus configured with suitable CCV conditions for curing the peroxide-curable polyethylene blend composition to give the coated conductor. CCV conditions include temperature, atmosphere (e.g., nitrogen gas), and line speed or passage time period through the CCV apparatus. Suitable CCV conditions may give a coated conductor exiting the CCV apparatus, wherein the coated conductor contains a crosslinked polyolefin layer formed by curing the layer of the crosslinked polyolefin layer.

The method of conducting electricity. The inventive method of conducting electricity may use the inventive coated conductor that comprises the insulated electrical conductor embodiment. Also contemplated is a method of transmitting data using the inventive coated conductor that comprises the insulated electrical conductor.

Advantageously we discovered that the inventive composition and crosslinked product are characterized by at least one, alternatively at least two, alternatively each of properties (i) to (iii): (i) enhanced (decreased) hot creep (also known as hot set); (ii) enhanced cure performance (increased cure rate or increased extent of cure); and (iii) enhanced (increased) time to scorch (ts1). For example, the inventive crosslinked product may have from 15% to 50% lower hot creep relative to a comparative crosslinked product. For instance as shown later in the examples, the comparative hot creep value may be 133%, whereas the inventive hot creep value may be 110% (17% lower) or the comparative hot creep value may be 115%, whereas the inventive hot creep value may be 60% (48% lower). The inventive compositions may have from 6% to 35% greater cure performances than those of the comparative compositions. For instance as shown later in the examples, the comparative delta torque may be 2.42 dNm and the inventive delta torque 2.57 dNm (6% greater performance) or comparative delta torque may be 2.3 dNm and the inventive delta torque 3.1 dNm (35% greater performance). Some of the inventive compositions may have from 4% to 30% longer times to scorch than those of the comparative compositions. For instance as shown later in some of the examples, the comparative time to scorch may be 86 minutes and the inventive time to scorch 90 minutes (5% longer) or comparative time to scorch may be 75 minutes and the inventive time to scorch 97 minutes (29% longer). The inventive crosslinked product is prepared from the inventive composition, whereas the comparative crosslinked product is prepared from a comparative composition that is identical to the inventive composition except the comparative composition lacks or is free of (D) propenyl-functional coagent. The inventive composition and crosslinked product enable increased production rate with no lumpiness, gave satisfactory or enhanced scorch performance, and satisfactory or enhanced cure performance. The inventive composition may be free of peroxide sweat out, which is migration of peroxide to surfaces of polymer resin pellets and exudation of peroxide therefrom. The inventive insulated electrical conductor is useful for data-transmitting applications and/or for electricity-transmitting applications, including low, medium, high, and ultra-high voltage applications.

The inventive composition (e.g., of aspects 1 to 5) and product (e.g., of aspect 7 to 9) are useful in a variety of applications including as a component of a coating of the coated conductor (e.g., the insulated electrical conductor) such as a coated wire or coated cable for use in the electrical or telecommunications industry, including medium voltage, high voltage, and extra-high voltage electrical cables. E.g., medium voltage electrical cables.

Test samples of embodiments of unfilled and filled compositions may be separately made into compression molded plaques. The mechanical properties of these compositions may be characterized using test samples cut from the compression molded plaques.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyolefin or C, H, and O required by an alcohol) are not excluded.

The following apply unless indicated otherwise. Alternatively precedes a distinct embodiment. ASTM means the standards organization, ASTM International, West Conshohocken, Pa., USA. IEC means the standards organization, International Electrotechnical Commission, Geneva, Switzerland. ISO means the standards organization, International Organization for Standardization, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substituted when referring to a compound means having, in place of hydrogen, one or more substituents, up to and including per substitution.

Unless noted otherwise herein, use the following preparations for characterizations.

Composition Preparation Method 1: using a Buss co-kneader. Compound the crosslinkable LDPE (A), the crosslinkable LDPE (B), and the (D) propenyl-functional coagent, plus any optional constituents, in a Buss co-kneader type MDK/b-46 configured with 15 l/d and zones 1 to 6 using a co-kneader speed of 200 rotations per minute (rpm) and the following temperature profile: zone 1 at 130° C., zone 2 at 140° C. zone 3 at 150° C., zone 4 at 160° C. zone 5 at 160° C., and zone 6 at 160° C., thereby giving a hot melt of a penultimate LDPE blend, which is free of the (C) organic peroxide. Average output is 20 kg of the hot melt of the penultimate LDPE blend per hour. In a subsequent step contact the (C) organic peroxide (typically in liquid form) to the hot melt of the penultimate LDPE blend, wherein the hot melt is at a temperature below the decomposition temperature of the (C) organic peroxide, to give a first hot melt of the inventive LDPE blend. If the decomposition temperature of the (C) organic peroxide is below the temperature at which the hot melt of the penultimate LDPE blend is made, a preliminary step of cooling the hot melt of the penultimate LDPE blend to a temperature below the decomposition temperature of the (C) organic peroxide, but above the melting temperature of the penultimate LDPE blend, may be performed followed by contacting the cooled hot melt of the penultimate LDPE blend with the (C) organic peroxide to give the first hot melt of the inventive LDPE blend. Alternatively, if desired, allow the hot melt of the penultimate LDPE blend to cool to ambient temperature to give a cooled embodiment of the penultimate LDPE blend at 25° C. If desired the cooled embodiment of the penultimate LDPE blend may be pelletized to give pellets of the penultimate LDPE blend. In a subsequent step, remelt the cooled embodiment of the penultimate blend to give a remelt thereof at a temperature below the decomposition temperature of the (C) organic peroxide, and contact the remelt with the (C) organic peroxide to give a second hot melt of the inventive LDPE blend. If desired, pelletize and/or cool the first or second hot melt of the inventive LDPE blend to ambient temperature. Alternatively, Composition Preparation Method 1 may be adapted to use compound the (C) organic peroxide with the crosslinkable LDPE (A), the crosslinkable LDPE (B), and the (D) propenyl-functional coagent, plus any optional constituents to directly produce (i.e., without going through the hot melt of the penultimate LDPE blend) a hot melt of the inventive LDPE blend. Such an adapted Composition Preparation Method 1 has a proviso that the temperatures of Zones 1-6 are kept at or above the melt temperatures of LDPE and peroxide but below the decomposition temperature of the (C) organic peroxide; wherein such suitable temperatures are from 110° (the typical melt temperature of (A) and (B)) to 140° C., alternatively from 112° to 135° C., alternatively from 115° to 130° C., alternatively from 115° to 125° C., e.g., 120° C.

Composition Preparation Method 2: using a roll mill. Compound the crosslinkable LDPE (A), the crosslinkable LDPE (B), the (C) organic peroxide, and the (D) propenyl-functional coagent, plus any optional constituents, in a Collin W150M roll mill having a front roll temperature at 130° C. and a back roll temperature at 125° C., a roll mill gap at 1 mm, and a roll speed at 200 rpm to give a hot melt of a LDPE blend. Upon melting a base resin or LDPE blend, add antioxidant (e.g., TBM-6) by sprinkling onto the hot melt over 3 to 5 minutes. Then if required add AMSD dropwise to the hot melt, and thoroughly homogenize the resulting molten band by repeating reduction and expansion of the hot melt. Finally, add (C) organic peroxide in small portions to the resulting homogenized hot melt, and repeat the homogenization method over 10 to 15 minutes to give a hot melt of the inventive blend. If desired, allow the hot melt to cool to ambient temperature to give the inventive LDPE blend at 25° C.

Composition Preparation Method 3. Melt blend constituents, except for peroxide, of the peroxide-curable polyethylene blend composition (of comparative or inventive examples) either in a Banbury compounder using a typical compounding temperature of 150° C., rotor speed of 60 to 65 rotations per minute (rpm) or in a ZKS twin-screw extruder using an extrusion temperature of 160° C. or higher (e.g., 200° C.) and a screw speed of 200 rpm. For laboratory scale procedures, use batch mixers and single screw extruders for melt blending and pelletizing. Soak peroxide into the pellets containing blended additives at 60° to 80° C. for 6 to 24 hours.

Compression Molded Plaque Preparation Method: a crosslinked product may be prepared in the form of a compression molded plaque by compression molding a 50 mil (1.3 mm) thick plaque of a peroxide-curable polyethylene blend composition at the following conditions: 500 psi (3.4 MPa) at 125° C. for 3 minutes, followed by 2500 psi (17 MPa) at 180° C. for 20 minutes, then cool at a rate of 1° to 30° C. per minute, e.g., 15°±5° C. per minute, at 2500 psi pressure, thereby giving a compression molded plaque form of the crosslinked product.

Delta Torque Test Method: measures scorch and cure performance such as cure speed or extent of cure. Delta torque is measured on an Alpha Technologies Rheometer MDR 2000E according to ISO 6502 as follows. Approximately 5 to 6 g of test material is transferred from a Collin roll mill to the MDR 200E instrument. Torque is measured as a function of time from 0 to 15 minutes at 180° C., and a torque curve versus time is plotted. Delta torque is the difference in torque at the maximum value of the curve minus the torque at the minimum value of the curve, expressed in deciNewton-meter (dNm). As a material cures, and crosslinks between molecules form therein, torque measured in the MDR increases. The extent of cure of a cured material is a function of the number of crosslinks therein, which extent can be estimated by the delta torque. All other things being equal, the greater the delta torque, the higher the number of crosslinks in the cured material the faster the cure speed and/or the greater the extent of cure. In a variation described later (see Scorch Time Test Method), torque is measured as a function of time from 0 to 120 minutes at 140° C., and a torque curve versus time is plotted.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Hot Creep (Hot Set) Test Method: A test sample (dog-bone-shaped of specified dimensions in ASTM 638-34; thickness<2 millimeter (mm); marker lines 20 mm apart) is placed in an oven at 200° C., and to the test sample is attached a weight equal to a force of 20 Newtons per square centimeter (N/cm$^2$). Elongation of the test sample (distance between marker lines) under these conditions is then measured, and expressed as a percentage of the initial 20 mm distance. If the distance between marker lines widens to 40 mm, the hot creep is 100% (100*(40-20)/20)=100%), to 100 mm, the hot creep is 400%. All other things being equal, the lower the level of crosslinking in the test sample, the greater the extent of elongation thereof. Conversely, the higher the level of crosslinking in the test sample, the lesser the extent of elongation thereof. If the level of crosslinking in the test sample is low enough, the test sample can fail by breaking, which may occur within a few minutes or even seconds of start of the testing. If the test sample is intact after 15 minutes, the weight is removed, the test sample is removed from the oven and allowed to cool to room temperature. Residual elongation of the test sample after cooling is measured. Although power cables may not experience operating temperatures as high as 200° C., this test is a reliable way for the industry to evaluate materials for use in insulation layers thereof. In the power cable industry, a hot creep of <175% after the test sample has been held for 15 minutes at 200° C. passes the hot creep test. And a hot creep of <100% after 15 minutes at 200° C. is especially desirable. Also, the residual elongation at room temperature should be <15% of the hot creep value measured at 200° C.

Melt index (190° C., 2.16 kilograms (kg), "$I_2$") Test Method: for ethylene-based (co)polymer is measured according to ASTM D1238-04, *Standard Test Method for Melt Flow Rates of Thermoplastics by Extrusion Platometer*, using conditions of 190° C./2.16 kilograms (kg), formerly known as "Condition E" and also known as $I_2$. Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

Scorch Time Test Method. Scorch time or time to scorch (ts1) of a sample "X" is measured by MDR at 140° C. and abbreviated ts1 @140° C. Scorch time is measured on an Alpha Technologies Rheometer MDR 2000E according to ISO 6502 as follows. Around 5 to 6 g of test material is transferred from a Collin roll mill to the MDR 200E instrument. Torque is measured as a function of time from 0 (start) to 120 minutes at 140° C., and torque curve versus time is plotted. The ts1 is the length of time it takes from the start of the test (0 minute) to observe an increase of 1 deciNewton-meter (dNm) in torque from the minimum value in the torque curve.

EXAMPLES

Constituent (A1): DFDK-7423 NT, a crosslinkable LDPE having a melt index ($I_2$) of 2.0 g/10 min. and a density of 0.920 g/cm$^3$ from The Dow Chemical Company.

Constituent (B1): LDPE 7009E, a crosslinkable LDPE characterized by a melt index ($I_2$) of 8.7 g/10 min. and a density of 0.919 g/cm$^3$ from The Dow Chemical Company.

Constituent (B2): LDPE 7010E, a crosslinkable LDPE characterized by a melt index ($I_2$) of 8.5 g/10 min. and a density of 0.919 g/cm$^3$ from The Dow Chemical Company.

Constituent (B3): LDPE 780E, a crosslinkable LDPE characterized by a melt index ($I_2$) of 20 g/10 min. (19.50 to 20.49 g/10 min.) and a density of 0.923 g/cm$^3$ from The Dow Chemical Company. Melt index ($I_2$) measured according to ISO 1133:2011.

Constituent (C1): dicumyl peroxide obtained commercially as PERKADOX BC—FF from AkzoNobel.

Constituent (D1): 2,4-diphenyl-4-methyl-1-pentene (AMSD). Obtained commercially as Nofmer MSD from NOF Corporation, White Plains, N.Y., USA.

Constituent (D2): 1,3-diisopropenylbenzene (DIPB). Obtained commercially from ABCR GmbH, Karlsruhe, Germany.

Constituent (E1): 2,2'-thiobis(2-t-butyl-5-methylphenol (CAS No. 90-66-4). Obtained commercially as LOW INOX TBM-6 from Addivant.

Extrusion Testing for Lumpiness: Extruder EP 45 is a 45 mm long, 25 inner diameter (I/d) ratio single barrier screw extruder. Employed sieve package of the following screen 900/425/200/900 μm. Selected the extruder temperature profile to match an actual cable extrusion set up: 120° C., 115° C., 115° C., 115° C., 115° C., adaptor 120° C., Head 120° C., and die 120° C. Tube die results in the production of a tube with approximately 3 cm outer diameter and a wall thickness of around 2.5 mm. The air gap (post extrusion) is around 100 cm, after which the extruded tube enters a water bath and is cooled directly. Extruder output (kilograms per hour (kg/hr)), extruder motor amp, pressure before and after the screen, melt temperature and the surface appearance of the extruded tubes are all determined as a function of extruder rotations per minute (rpm). Troester extruder is suitable to evaluate polymer processability and the insulation layer lumpiness or "inhomogeniety" problem. Extrusion results for a comparative sample (CS1) versus inventive blend samples (IS1 and IS2) are summarized below in Table 1.

TABLE 1

Compositions and Extruding Test Results for Samples. ("0" means 0.00)

| Constituent (wt %) | CS1 | IS1 | IS2 |
|---|---|---|---|
| (A1) | 100 | 80 | 85 |
| (B1) | 0 | 20 | 0 |
| (B3) | 0 | 0 | 15 |
| Example Total | 100.00 | 100.00 | 100.00 |
| Output at 100 rpm (kg/hr) | 26.6 | 30.7 | 29.8 |
| Onset of lumpiness (rpm) | 80 to 100 | None at 120 | None at 120 |

As shown by the data in Table 1, the inventive LDPE blends enabled increased production rate with no lumpiness relative to the unblended LDPE.

Comparative Examples 1, 2, 3a and 3b (CE1, CE2, CE3a and CE3b): see Composition Preparation Method 1.

Inventive Examples 1a, 1b, 2, 3a, and 3b (IE1a, IE1 b, IE2, IE3a, IE3b): see Composition Preparation Method 1.

The compositions and characterized properties of the peroxide-curable polyethylene blend compositions of IE1 b, IE2, IE3a, IE3b, C1, C2, CE3a, and CE3b shown later in Tables 2 and 3.

Samples of the compositions of IE1 b, IE2, IE3a, IE3b, C1, C2, CE3a, and CE3b were tested for crosslinking characteristics in a moving die rheometer (MDR) at 140° C. or 182° C., as the case may be. Other samples of the compositions were compression molded under conditions that prevented significant crosslinking, and tested for melt rheological characteristics. Conditions that prevented significant crosslinking were pressing at 500 psi (3.5 MPa) at 120° C. for 3 minutes, followed by 2500 psi (17 MPa) at 120° C. for 3 minutes, then cooling to 30° C. under the latter pressure, and opening the press and removing the resulting compression molded plaques. Still other samples of the compositions were compression molded under complete crosslinking conditions to make specimens of different dimensions (see Compression Molded Plaque Preparation Method above), and the specimens were tested for mechanical properties. The data are shown below in Tables 2 and 3.

TABLE 2

Compositions and Test Results for Examples. ("0" means 0.00)

| Constituent (wt %) | CE1 | IE1a | IE1b | CE2 | IE2 |
|---|---|---|---|---|---|
| (A1) | 78.16 | 77.88 | 77.98 | 83.05 | 82.75 |
| (B1) | 19.54 | 19.47 | 19.49 | 0 | 0 |
| (B2) | 0 | 0 | 0 | 0 | 0 |
| (B3) | 0 | 0 | 0 | 14.65 | 14.6 |
| (C1) | 2 | 2 | 2 | 2 | 2 |
| (D1) | 0 | 0.35 | 0 | 0 | 0.35 |
| (D2) | 0 | 0 | 0.23 | 0 | 0 |
| (E1) | 0.3 | 0.3 | 0.3 | 0.3 | 0.3 |
| Example Total | 100.00 | 100.00 | 100.00 | 100.00 | 100.00 |
| Hot Creep (%) | 115 | 85 | 60 | 145 | 90 |
| Decreased in Hot Creep (%) | NMF | 26 | 48 | NMF | 38 |
| 140° C. ts1 (min.) | 72 | 90 | 60 | 86 | 90 |
| Increased Scorch Time (%) | NMF | 25 | −17 | NMF | 5 |
| 180° C. Delta torque (dNm) | 2.7 | 3.1 | 3.3 | 2.3 | 3.1 |
| Increased in Cure Performance (%) | NMF | 15 | 22 | NMF | 35 |

*NMF = not meaningful.

TABLE 3

Compositions and Test Results for Examples. ("0" means 0.00)

| Constituent (wt %) | CE3a | IE3a | CE3b | IE3b |
|---|---|---|---|---|
| (A1) | 62.7 | 63.3 | 62.7 | 63.3 |
| (B1) | 0 | 0 | 0 | 0 |
| (B2) | 35 | 34.05 | 0 | 0 |
| (B3) | 0 | 0 | 35 | 34.05 |
| (C1) | 2 | 2 | 2 | 2 |
| (D1) | 0 | 0.35 | 0 | 0.35 |
| (E1) | 0.3 | 0.3 | 0.3 | 0.3 |
| Example Total | 100.00 | 100.00 | 100.00 | 100.00 |

TABLE 3-continued

Compositions and Test Results for Examples. ("0" means 0.00)

| Constituent (wt %) | CE3a | IE3a | CE3b | IE3b |
|---|---|---|---|---|
| Hot Creep (%) | 133 | 110 | 171 | 125 |
| Decreased in Hot Creep (%) | NMF | 17 | NMF | 27 |
| 140° C. ts1 (min.) | 78 | 101 | 75 | 97 |
| Increased Scorch Time (%) | NMF | 29 | NMF | 29 |
| 180° C. Delta torque (dNm) | 2.47 | 2.66 | 2.42 | 2.57 |
| Increased in Cure Performance (%) | NMF | 8 | NMF | 6 |

*NMF = not meaningful.

The data in Tables 2 and 3 show that the inventive composition and crosslinked product are characterized by at least one, alternatively at least two, alternatively each of properties (i) to (iii): (i) enhanced (decreased) hot creep (also known as hot set); (ii) enhanced cure performance (e.g., increased extent of cure); and (iii) enhanced (increased) time to scorch (ts1). For example, the inventive examples showed from 15% to 50% lower hot creep relative to the comparative examples. The inventive examples showed from 6% to 35% greater cure performances than those of the comparative compositions. All but one of the inventive examples showed from 4% to 30% longer times to scorch than those of the comparative compositions.

The invention claimed is:

1. A peroxide-curable polyethylene blend composition comprising a blend of constituents (A) and (B) that contains constituents (C) and (D): (A) a crosslinkable low density polyethylene characterized by a melt index (190° C., 2.16 kilograms (kg), ASTM D1238-04, "melt index ($I_2$)") of 1.50 to 2.49 grams per 10 minutes (g/10 min.) ("crosslinkable LDPE (A)" or "constituent (A)" or "(A)"); (B) a crosslinkable low density polyethylene characterized by a melt index ($I_2$) of 5.0 to 25 g/10 min. ("crosslinkable LDPE (B)" or "constituent (B)" or "(B)"); (C) an organic peroxide that is dicumyl peroxide; (D) a propenyl-functional coagent that is 2,4-diphenyl-4-methyl-1-pentene or 1,3-diisopropenylbenzene; and constituent (E) antioxidant that is 2,2'-thiobis(2-t-butyl-5-methylphenol; wherein concentrations thereof are: (A) is 89 to 61 wt % weight percent (wt %), (B) is 10.1 to wt %, (C) is 2 wt %, and (D) is 0.23 to 1.0 wt %, all based on total weight of the peroxide-curable polyethylene blend composition.

2. The peroxide-curable polyethylene blend composition of claim 1 further described by any one of limitations (i) to (iii): (i) the blend of (A) and (B) is characterized by a melt index ($I_2$) of 2.5 to 4.5 g/10 min. and/or a concentration from 85 to 98 wt %, based on total weight of the composition; (ii) constituent (A) is characterized by a melt index ($I_2$) of 1.6 to 2.4 g/10 min. and/or a concentration from 89 to 61 wt %, based on total weight of the composition; (iii) constituent (B) is characterized by a melt index ($I_2$) from 7 to 23 g/10 min. and/or a concentration from 14 to 35 wt %, based on total weight of the composition.

3. A method of making a peroxide-curable polyethylene blend composition of claim 1, the method comprising contacting effective amounts of constituents (A) to (D), and constituent (E), to give the peroxide-curable polyethylene blend composition.

4. A crosslinked polyethylene product that is a product of curing the peroxide-curable polyethylene blend composition claim 1.

5. A manufactured article comprising a shaped form of the crosslinked polyethylene product of claim 4.

6. A coated conductor comprising a conductive core and an insulation layer at least partially covering the conductive core, wherein at least a portion of the insulation layer comprises the crosslinked polyethylene product of claim 5.

7. A method of conducting electricity, the method comprising applying a voltage across the conductive core of the coated conductor of claim 6 so as to generate a flow of electricity through the conductive core.

* * * * *

UNITED STATES PATENT AND TRADEMARK OFFICE
CERTIFICATE OF CORRECTION

| | | |
|---|---|---|
| PATENT NO. | : 11,236,220 B2 | Page 1 of 1 |
| APPLICATION NO. | : 16/607562 | |
| DATED | : February 1, 2022 | |
| INVENTOR(S) | : Stephen H. Cree and Mikhail Bogdanov | |

It is certified that error appears in the above-identified patent and that said Letters Patent is hereby corrected as shown below:

In the Claims

Column 18, Claim 1, Line 46 should read: 35 wt%, (C) is 2 wt% , and (D) is 0.23 to 1.0 wt% , all based Signed and Sealed this
Twelfth Day of July, 2022

Katherine Kelly Vidal
*Director of the United States Patent and Trademark Office*